United States Patent Office 3,335,152
Patented Aug. 8, 1967

3,335,152
PREPARATION OF 4-HYDROXYBENZOTHIO-
PHENE IN VAPOR PHASE WITH NOBLE
METAL CATALYSTS
Harold A. Kaufman, Piscataway Township, New Brunswick County, and John R. Kilsheimer, Westfield, N.J., assignors to Mobil Oil Corporation, a corporation of New York
No Drawing. Filed June 29, 1965, Ser. No. 468,094
8 Claims. (Cl. 260—330.5)

ABSTRACT OF THE DISCLOSURE

Hydrogenated 4-ketobenzothiophene and substituted derivatives are dehydrogenated to form the corresponding 4-hydroxybenzothiophene, by vapor phase contact with Pt or Pd Series metal catalyst in the presence of 5–30 moles $H_2$ per mole of reactant. The 4-hydroxybenzthiophenes can be converted, by known methods, to benzothienylcarbamate pesticides.

---

This invention relates to the manufacture of 4-hydroxybenzothiophene. It is particularly concerned with an improved vapor phase synthesis of 4-hydroxybenzothiophene.

The compound, 4-hydroxybenzothiophene, is an organic intermediate for the synthesis of N-substituted benzothienylcarbamates, which have excellent pesticidal properties (Belgian Patent No. 638,684). The 4-hydroxybenzothiophene is converted to N-substituted benzothienylcarbamates by methods well known in the art to be applicable to hydroxyaromatic compounds. Typically, the hydroxyaromatic compound is reacted with phosgene to form the chloroformate and the chloroformate is reacted with a primary or secondary amine to form the carbamate (U.S. Patent No. 3,084,096). This intermediate was prepared by reaction of 4-keto-4,5,6,7-tetrahydrobenzothiophene and sulfur by Fieser and Kennelly (J. Am. Chem. Soc., 57, 1611–1616 (1935)). They reported the best yields obtained were 46%. The use of other dehydrogenation methods, such as catalytic dehydrogenation, is normally hampered by sulfur-containing materials. Care must be taken to avoid substantial conversion to benzothiophene, which would be a total loss to the process. Likewise, many dehydrogenation catalysts, such as metals of the platinum and palladium series, are known to be poisoned by sulfur-containing compounds, particularly when used at substantially atmospheric pressure.

It is a discovery of this invention that hydrogenated keto-benzothiophenes can be dehydrogenated in high yield to 4-hydroxybenzothiophene in vapor phase contact with metal catalysts of the platinum and palladium series, at substantially atmospheric pressure, when relatively high molar ratios of hydrogen to hydrogenated keto-benzothiophene reactant are employed. This is rather surprising because it would be expected that large amounts of hydrogen would favor conversion to benzothiophene. Accordingly, a broad object of this invention is to provide an improved process for preparing 4-hydroxybenzothiophene. Another object is to provide an improved catalytic vapor phase process for the dehydrogenation of a hydrogenated keto-benzothiophene reactant. A specific object is to provide an improved catalytic vapor phase process for dehydrogenating a hydrogenated keto-benzothiophene reactant. A specific object is to provide an improved catalytic vapor phase process for dehydrogenating a hydrogenated keto-benzothiophene reactant to 4-hydroxybenzothiophene in the presence of catalytic metals of the platinum and palladium series and of high molar ratios of hydrogen. Other objects and advantages of this invention will become apparent to those skilled in the art, from the following detailed description.

This invention provides a process for producing 4-hydroxybenzothiophene that comprises contacting, in the vapor phase, a hydrogenated 4-keto-benzothiophene reactant and hydrogen with a metal catalyst of the platinum and palladium series of metals, using a molar ratio of hydrogen to said keto-benzothiophene reactant of between about 5:1 and about 30:1.

The material that is dehydrogenated in the process of this invention is a hydrogenated 4-keto-benzothiophene reactant. This reactant is at least partially hydrogenated (saturated) on the benzene ring or on both rings. It can be completely saturated. Typical reactants are 4-keto-2,3,4,7-tetrahydrobenzothiophene; 4-keto-4,7-dihydrobenzothiophene; 4-keto-4,5,6,7-tetrahydrobenzothiophene; 4-keto-2,3,4,5,6,7-hexahydrobenzothiophene; 4-keto-2,4,5,6,7,7a-hexahydrobenzothiophene; and 4-keto-2,3,3a,4,5,6,7,7a-octahydrobenzothiophene.

The catalysts used in the vapor phase process of this invention are metals of the platinum and palladium series on an inert support. The platinum and palladium series of metals are those having Atomic Numbers of 44–46, inclusive, and 76–78, inclusive. The inert carriers contemplated herein are materials that do not effect unwanted side reactions under the process conditions, such as cracking and dehydration (to benzothiophene). Typical inert carriers are activated carbon, coke, pumice, charcoal, barium sulfate, and inert earths. The carriers can be in any shape or form, such as rods, spheres, or pellets. The amount of platinum or palladium series metals in the catalyst can be between about 0.05 percent and about 20 percent, by weight of the catalyst, and preferably between about 0.1 percent and about 5 percent.

The process of this invention is operated in the vapor phase. Accordingly, the reaction temperature must be sufficiently high to vaporize the hydrogenated keto-benzothiophene reactant. Generally, temperatures of between about 300° C. and about 700° C. are utilizable, but it is preferred to operate at between about 450° C. and about 700° C.

Although the process of this invention can be carried out batchwise, it is more feasibly run continuously. In typical operation, the vaporized hydrogenated keto-benzothiophene reactant and hydrogen are passed through a static bed (or fluidized static bed) of catalyst. The rate of charge, which varies inversely with temperature, corresponds to an LHSV (volume liquid charge/volume catalyst/hour) of between about 0.1 and about 5, preferably between about 0.5 and about 2.5.

The use of high molar ratios of hydrogen to hydrogenated keto-benzothiophene reactant is an advantageous feature of the process of this invention. Surprisingly, catalyst activity is maintained despite the use of a sulfur-containing compound reactant. Also, degradation of reactant to undesirable by-products is minimized, so that unreacted reactant can be recycled to extinction. Generally, the hydrogen to reactant molar ratio will be between about 5:1 and about 30:1. Although it is not an essential feature of the process of this invention, it may sometimes be desirable to dilute the hydrogen and hydrogenated keto-benzothiophene reactant feed mixture further with steam. Such dilution can be effective in increasing catalyst on-stream time. In general, ratios of 0–5 moles steam per mole keto-benzothiophene reactant may be used.

EXAMPLE 1

A continuous vapor phase run was carried out, using a reaction column containing 8 cc. (3 g.) of catalyst comprising 0.2 weight percent palladium supported on activated carbon maintained at 500° C. There was charged 4-keto-4,5,6,7-tetrahydrobenzothiophene at an LHSV of 0.78 together with hydrogen at a molar ratio of hydrogen to 4-keto-4,5,6,7-tetrahydrobenzothiophene of 28:1. During the run, the yields of 4-hydroxybenzothiophene were between 85 and 99 percent.

EXAMPLES 2 THROUGH 4

A series of continuous vapor phase runs was carried out contacting hydrogen, steam, and 4-keto-4,5,6,7-tetrahydrobenzothiophene with a catalyst comprising 0.5 weight percent platinum on a calcium carbonate support. In each run, the molar proportion of hydrogen to steam to 4-keto-4,5,6,7-tetrahydrobenzothiophene was 5:4:1, but the temperature and contact time were varied. Pertinent run data and results are set forth in Table I.

TABLE I

| Example | Temp., °C. | Contact Time, sec. | 4-hydroxybenzothiophene | |
|---|---|---|---|---|
| | | | Conversion, Percent | Yield per Pass percent |
| 2 | 500 | 1.0 | 47.1 | 34.0 |
| 3 | 600 | 1.0 | 97.6 | 86.8 |
| 4 | 700 | 0.12 | 92.1 | 67.0 |

EXAMPLES 5 THROUGH 8

In a series of runs, 4-keto-4,5,6,7-tetrahydrobenzothiophene and hydrogen were contacted with a catalyst comprising 5 weight percent palladium supported on barium sulfate at a temperature of 700° C. In all runs except that of Exaxmple 8, additional steam diluent was used. Pertinent run data and results are set forth in Table II.

TABLE II

| Example | Contact, Time, sec. | Feed, Molar Ratio, H₂:Steam:Ketone | 4-hydroxybenzothiophene | |
|---|---|---|---|---|
| | | | Conversion, percent | Yield per Pass, percent |
| 5 | 0.25 | 5:4:1 | 94.9 | 76.5 |
| 6 | 0.50 | 5:4:1 | 100.0 | 76.8 |
| 7 | 0.50 | 5:1:1 | 100.0 | 76.5 |
| 8 | 0.50 | 5:0:1 | 100.0 | 71.9 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing 4-hydroxybenzothiophene that comprises contacting, in the vapor phase, a hydrogenated 4-keto-benzothiophene reactant selected from the group consisting of 4-keto-2,3,4,7-tetrahydrobenzothiophene; 4-keto-4,7-dihydrobenzothiophene; 4-keto-4,5,6,7-tetrahydrobenzothiophene; 4-keto-2,3,4,5,6,7-hexahydrobenzothiophene; 4-keto-2,4,5,6,7,7a-hexahydrobenzothiophene; and 4-keto-2,3,3a,4,5,6,7,7a-octahydrobenzothiophene; and hydrogen with a metal catalyst of the platinum and palladium series of metals having atomic numbers of 44–46, inclusive, and 76–78, inclusive, using a molar ratio of hydrogen to said keto-benzothiophene reactant of between about 5:1 and about 30:1.

2. A process for producing 4-hydroxybenzothiophene that comprises contacting, in the vapor phase, 4-keto-4,5,6,7-tetrahydrobenzothiophene and hydrogen with a metal catalyst of the platinum and palladium series of metals having atomic numbers of 44–46, inclusive, and 76–78 inclusive, using a molar ratio of hydrogen to said 4-keto-4,5,6,7-tetrahydrobenzothiophene of between about 5:1 and about 30:1.

3. The process defined in claim 1, wherein said metal catalyst is palladium supported on activated carbon.

4. The process defined in claim 2, wherein said metal catalyst is palladium supported on activated carbon.

5. The process defined in claim 1, wherein said metal catalyst is platinum supported on calcium carbonate.

6. The process defined in claim 2, wherein said metal catalyst is platinum supported on calcium carbonate.

7. The process defined in claim 1, wherein said metal catalyst is palladium supported on barium sulfate.

8. The process defined in claim 2, wherein said metal catalyst is palladium supported on barium sulfate.

References Cited

UNITED STATES PATENTS 2,503,641  4/1950  Taylor et al. _____ 260—621

OTHER REFERENCES

Freidlin, et al., Chemical Abstracts, 45, 3698g (1951).

WALTER A. MODANCE, *Primary Examiner.*

CECILIA M. SHURKO, *Assistant Examiner.*